(12) United States Patent
Lizarraga Senar

(10) Patent No.: US 11,511,585 B2
(45) Date of Patent: Nov. 29, 2022

(54) SHOCK ABSORBER WITH HYDRAULIC LOAD REGULATION SIMULTANEOUSLY DEPENDING ON SPEED AND FREQUENCY

(71) Applicant: Kyb Europe GmbH, Sucursal En Navarra, Ororbia (ES)

(72) Inventor: Javier Lizarraga Senar, Ororbia (ES)

(73) Assignee: Kyb Europe GmbH, Sucursal En Navarra, Navarra (ES)

( * ) Notice: Subject to any disclaimer, the term of this patent is extended or adjusted under 35 U.S.C. 154(b) by 349 days.

(21) Appl. No.: 16/734,091

(22) Filed: Jan. 3, 2020

(65) Prior Publication Data
US 2020/0215864 A1 Jul. 9, 2020

(30) Foreign Application Priority Data
Jan. 4, 2019 (ES) .................. P201930008

(51) Int. Cl.
| F16F 9/14 | (2006.01) |
| F16F 13/08 | (2006.01) |
| F16F 9/34 | (2006.01) |
| F16F 9/348 | (2006.01) |
| F16F 9/512 | (2006.01) |

(52) U.S. Cl.
CPC .............. *B60G 13/08* (2013.01); *F16F 9/34* (2013.01); *F16F 9/3488* (2013.01); *F16F 9/512* (2013.01); *B60G 2202/24* (2013.01); *B60G 2400/202* (2013.01); *B60G 2400/91* (2013.01); *B60G 2500/114* (2013.01); *F16F 2228/04* (2013.01)

(58) Field of Classification Search
CPC . B60G 13/08; F16F 9/34; F16F 9/3405; F16F 9/3481; F16F 9/3488

USPC ............ 188/282.1, 282.5, 282.8, 313, 314
See application file for complete search history.

(56) References Cited

U.S. PATENT DOCUMENTS

| 5,018,608 | A | 5/1991 | Imaizumi |
| 7,395,907 | B2 | 7/2008 | de Kock et al. |
| 9,534,653 | B2 * | 1/2017 | Kim ...................... F16F 9/3405 |
| 10,473,180 | B2 * | 11/2019 | Förster ................... F16K 15/18 |
| 10,563,721 | B2 * | 2/2020 | Knapczyk ............. F16F 9/3481 |
| 2009/0084647 | A1 * | 4/2009 | Maneyama ............... F16F 9/34 188/314 |
| 2015/0276005 | A1 | 10/2015 | Kim |
| 2018/0187737 | A1 * | 7/2018 | Förster .................. F16F 9/3488 |
| 2018/0187738 | A1 | 7/2018 | Förster |

FOREIGN PATENT DOCUMENTS

WO  2017112978 A1  7/2017

* cited by examiner

*Primary Examiner* — Christopher P Schwartz
(74) *Attorney, Agent, or Firm* — The Webb Law Firm

(57) ABSTRACT

The present disclosure relates to a shock absorber with hydraulic load regulation with a rod ending in a pin, which incorporates a longitudinal channel such that the shock absorber includes a frequency amplifier which, in turn, includes a housing, a floating piston which slides along the inside of the housing achieving a seal, and a pressure control valve, wherein the pressure control valve is configured to open when the amplifier chamber reaches a certain pressure level, enabling the outlet of fluid from the amplifier chamber such that the pressure of the amplifier chamber acts on the floating piston, which moves to regulate the flow of fluid through the piston by means of an elastic element acting on valves.

12 Claims, 11 Drawing Sheets

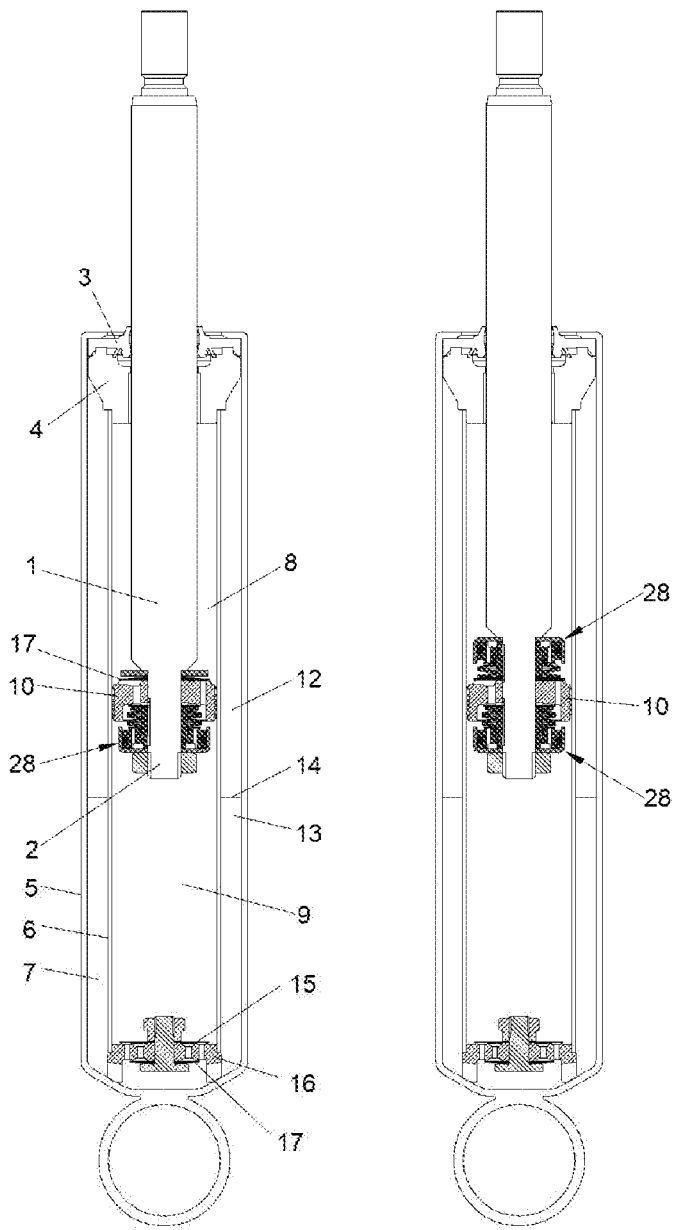

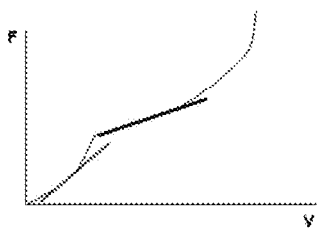
FIG. 14
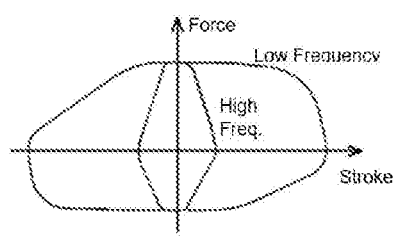 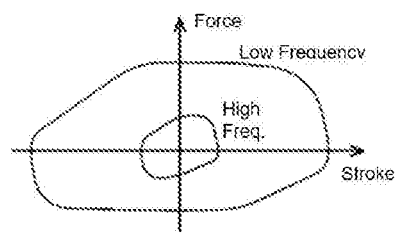
FIG. 15a          FIG. 15b
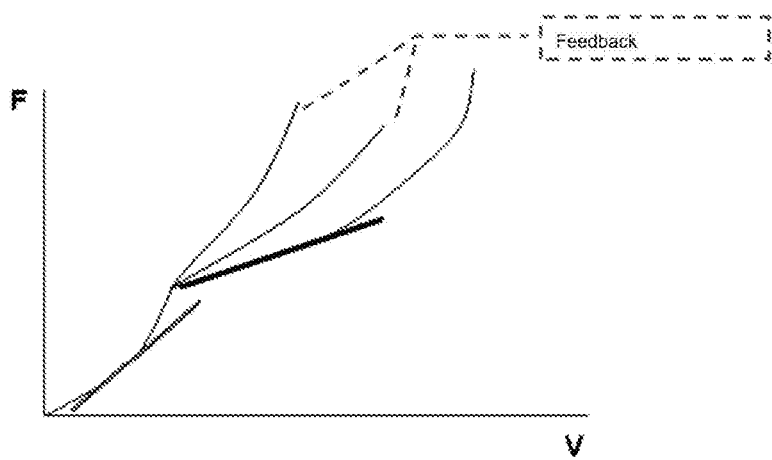
FIG. 16

SHOCK ABSORBER WITH HYDRAULIC LOAD REGULATION SIMULTANEOUSLY DEPENDING ON SPEED AND FREQUENCY

CROSS-REFERENCE TO RELATED APPLICATIONS

This application claims priority to Spanish Patent Application No. P201930008 filed Jan. 4, 2019, the disclosure of which is hereby incorporated by reference in its entirety.

BACKGROUND OF THE INVENTION

Field of the Invention

The present invention relates to a shock absorber which is capable of regulating the load generated by a hydraulic device depending on the speed and frequency to which it is subjected simultaneously, both for compression and extension movements.

In some non-limiting aspects or embodiments, the present disclosure is applicable in the industry of shock absorbers that use a fluid as a shock-absorbing agent, and the automotive industry in particular.

Description of Related Art

The shock absorber is a device intended to mitigate oscillations in a suspension until it regains the position of equilibrium thereof by dissipating kinetic energy. A very common case of this development focuses on the application thereof for automobiles.

Focusing on the automotive sector, the shock absorber has a decisive influence on both stability and comfort. In fact, the adjustment of the hydraulic load it generates is based on a compromise between both factors:
  in terms of stability, the vehicle is dynamically controlled at low extension and compression speeds of the suspension and at low oscillation frequencies corresponding to the natural frequency of the suspended mass (cabin), which is typically in the 1-2 Hz range for passenger cars. This mode of operation requires a high level of damping, e.g., high hydraulic loads;
  in terms of comfort, control is mainly related to medium and high extension and compression speeds in the suspension, which take place at medium or high oscillation frequencies. The frequency of reference is the natural frequency of the non-suspended mass (wheel/suspension), which is typically in the 8-15 Hz range for passenger cars. A higher degree of comfort is subject to a reduced level of damping, which makes it possible to decouple the movement of the wheels from the oscillations of the chassis.

Therefore, it is desirable for the shock absorber to be able to adjust the load level thereof to the features of the oscillations it intends to mitigate.

Thus, on the one hand, the shock absorber must be able to adapt depending on the oscillation speed of the suspension. In the state of the art, the internal configuration of the shock absorber and the valves thereof is designed to generate a higher damping coefficient for low speeds than for medium and high speeds. The function which relates the load of a shock absorber and the oscillation speed thereof is the main feature of it and the curve on which it acts in order to optimise the compromise between stability and comfort.

FIG. 14 refers to a graph representing the damping force as a function of the oscillation speed of a shock absorber. The slope indicates the damping coefficient. The higher the slope, the higher the damping coefficient. Therefore, at low speeds, the damping coefficient, e.g., the slope of the curve, is higher than for medium and high speeds.

Moreover, the shock absorber must be able to adapt depending on the oscillation speed of the suspension A conventional shock absorber is unable to adapt the response thereof to the frequency of the oscillation. In the state of the art, there are solutions that incorporate the feature described above in the shock absorber. A first type consists of adding a valve arranged parallel to the main piston of the shock absorber, which enables the flow of fluid starting from a certain frequency of the oscillation.

One of these devices is described in document U.S. Pat. No. 7,395,907. The object of this document is a hydraulic shock absorber, wherein an auxiliary device is installed at the end of the pin of the rod, which is responsible for regulating the damping load depending on the frequency.

However, this invention has a series of problems or limitations.

First, it only regulates the frequency of the damping produced during the extension stroke.

Second, as it is a device that is added to the end of the pin of the rod, it occupies additional space in the axial direction, resulting in a reduction in the maximum stroke of the shock absorber or making it unfeasible to be installed in some suspensions due to a lack of space. Reducing the stroke of the shock absorber leads to less comfort, as the ends of the stroke of the suspension are reached more often.

Third, the parallel installation of the frequency valve requires drilling a large hole in the pin of the rod in order to enable the system to remain effective at medium speeds, where the flow rates to be exchanged are significant. This reduces the strength of the pin, limiting the hydraulic and mechanical forces it can withstand.

Fourth, to achieve a good compromise between the flow cross section of the hole and the strength of the pin of the rod, the effect on the frequency is limited for high-speed movements.

Fifth, the frequency control chamber is connected to the traction chamber of the shock absorber, which is located above the piston, by a small, virtually symmetrical flow in both flow directions of the fluid. The principle of operation of the invention is based on the imposition, by this duct, of a significant restriction to the access of the fluid to the frequency chamber, such that the associated delay makes it possible to regulate frequency. This delay is also present when the fluid returns from the frequency chamber to the traction chamber, which is essential for restoring the system to the initial position thereof after operating at a low frequency. With this, the regulation of high-frequency damping is limited by the time required for the invention to return to the initial position thereof, something that is especially serious in a frequency regulator. Furthermore, the combination of pressures from the traction and compression chambers during the extension movement of the shock absorber favours the filling of the frequency chamber, but not the emptying thereof during the extension movement or during the compression movement.

When the shock absorber operates at low frequencies, the frequency chamber is filled and has to be subsequently emptied in order to make it available as soon as possible. The problem is that the delay of the system described in this document does not enable the quick return of the fluid to the traction chamber, which conditions the response of the shock absorber if it is then subjected to a high frequency.

U.S. Pat. No. 9,534,653 describes a shock absorber with a piston capable of improving ride comfort by exhibiting a damping performance over a low-frequency section and a high-frequency section. To do this, the pin of the rod incorporates a longitudinal bypass passageway, formed by two flat recesses made in the pin of the rod. The piston has a frequency chamber that is in turn divided into two sub-chambers, which are connected by means of two holes made in a bushing that is installed in the pin of the rod, said frequency chamber being responsible for regulating the shock absorber according to frequency.

Document U.S. Pat. No. 9,534,653 partially resolves some of the problems in U.S. Pat. No. 7,395,907 as follows.

On the one hand, the hole of the pin of the rod is removed, replacing it with flat faces which result in a lower reduction of the mechanical strength of the pin.

Moreover, it requires less axial space inside the shock absorber, which enables longer suspension strokes.

However, a number of issues remain unresolved. For example, like in the previous document, it only regulates the frequency of the damping produced in the extension stroke and not in the compression stroke.

Furthermore, the reduction of high-frequency damping is still based on the evacuation of fluid through a passageway which operates parallel to that of the main valve that regulates the low-frequency damping. The available flow cross section remains very limited, greatly reducing the frequency effect for medium and high speeds.

The return of the system to the initial position thereof is slow given the difficulty of filling the upper frequency subchamber and emptying the lower frequency subchamber after an operation at a low frequency. Again, the difference in pressure between the frequency and traction sub-chambers is favourable for regulating damping during extension movements, but unfavourable when the system is allowed to return to the rest position. Once again, all of this limits the regulatory effect thereof at high frequencies. Document WO/2017/112978, considered to be the closest state of the art, describes a shock absorber with a frequency chamber that acts directly against the main valve of the piston, thereby regulating the damping load according to frequency. This document eliminates the leakage flow parallel to the main valve of the shock absorber as a damping-regulating element according to frequency described in the previous documents. In this manner, the following problems present in these documents are resolved:

The invention is capable of regulating the frequency of the damping produced in both the extension and the compression strokes.

Removing the parallel fluid flow, as a regulating element, minimises the problems associated with maintaining the frequency effect at high speeds, since the ducts and the main valve of the piston are used with a purely upper flow cross section.

However, the shock absorber described in document WO/2017/112978 still maintains some of the problems referred to above and even adds new ones, such as the following: The return of the system to the rest position thereof is still as difficult as in the other documents, due to the fact that the frequency chamber is still connected to the traction chamber by a narrow passageway that slows down the filling thereof to be able to regulate the frequency. Therefore, the problems described in previous documents in this regard remain applicable and limit the capacity of the system to regulate at high operating frequencies. The shock absorber described in WO/2017/112978 proposes an improvement based on an anti-return valve, the application of which involves significant costs due to the complexity, dimensions and intricate geometry thereof, as well as serious dispersion problems in the frequency behaviour obtained.

A major problem added to the shock absorber described in WO/2017/112978 is that the pressure of the frequency chamber is applied directly and without restrictions to the main valve of the piston, increasing the restriction to the flow of fluid that it imposes. This in turn increases the pressure in the frequency chamber, thus setting up a system with feedback. This puts the mechanical strength of some components of the invention and the shock absorber at risk in high-speed and/or high-amplitude movements. Furthermore, it strongly limits the correct distribution of speed-dependent damping, making it impossible to have high damping coefficients at low speeds and low damping coefficients at high speeds. FIG. 16 shows how the regulation of the shock absorber varies due to feedback. Since force is applied directly to the main valve, a restriction is being imposed on the operation of the shock absorber, which has an impact on medium and high speeds wherein the damping force, and therefore the restriction, need to be as low as possible to increase comfort and obtain a soft suspension. This does not happen in previous systems because the speed-dependent damping feature low frequency is totally independent from high frequency, since they are decoupled devices. Therefore, even if it improves comfort depending on frequency, it worsens it depending on speed. That is, the shock absorber described in WO/2017/112978 is adjusted depending on frequency but at the expense of degrading the speed-dependent adjustment.

Finally, the document proposes a full coupling between the main valve of the shock absorber and the feedback of the frequency system, which merge into a single frequency valve. Therefore, the pressure generated in the frequency chamber is applied directly to the main valve, without any clearance between the components, which decreases the potential of reducing the damping for medium frequencies especially, but also for high frequencies.

SUMMARY OF THE INVENTION

The present invention solves these limitations by also regulating the damping load by taking frequency and speed into account by means of the capacity to quickly empty the frequency amplifier, which makes it possible to prepare the shock absorber after a low-frequency movement to receive a high-frequency movement, as well as limiting the pressure in the frequency amplifier, which is achieved by using two independent valves, a primary and a secondary valve, in addition to the pressure control valves in the frequency amplifier, consisting of a pressure-limiting valve, which operates together with a pressure-limiting stop limiter, and a pressure-regulating valve.

In order to achieve the objectives and avoid the drawbacks mentioned above, the present invention describes a shock absorber with hydraulic load regulation simultaneously depending on speed and frequency. The shock absorber, in addition to a pin of the rod comprising a longitudinal channel with the function that will be described below, incorporates a guide bushing, a primary valve, a secondary valve, an elastic element and a frequency amplifier which among the main elements, comprises a housing, a floating piston and a pressure control valve.

The housing is fixed by embracing the pin of the rod and has a cylindrical configuration formed by a base and a concentric wall with respect to the pin of the rod.

The guide bushing is also fixed by embracing the pin of the rod, overlapping with a portion of the longitudinal channel and freeing one end by means of which a fluid, located on the other side of the piston, can directly access the longitudinal channel inside the guide bushing by means of a through hole of the piston. The guide bushing is also joined to the housing at the other end, enabling, either by means of a narrow duct created by a castellated configuration of the end of the guide bushing or by means of a relief disc located at the end of the guide bushing, a fluid to access the outside of the guide bushing from the longitudinal channel to reach the inside of the volume that makes up the housing.

The elastic element embraces the guide bushing. Due to the versatility thereof, Belleville washers are preferred, which can be configured in terms of elasticity, outer diameter and number and provide a wide array of options in terms of definition when configuring stresses in the system.

The primary valve is positioned in contact with the piston, preferably by means of a relief disc. The secondary valve, on the other hand, is located between two spacers, one that separates it from the primary valve and another that separates it from the elastic element. The spacer can be, for example, a washer.

To enable the primary valve to bend when pressed by the secondary valve, the outer diameter of the secondary valve is smaller than the outer diameter of the primary valve. The assembly consisting of the primary valve, the secondary valve, the relief disc and the spacers can be found in two positions. One of them is embracing the guide bushing and located between the piston and the elastic element. The other is embedded between the piston and the guide bushing.

Lastly, the floating piston is located in the volume that makes up the housing. It is capable of sliding between the guide bushing and the housing wall by achieving a seal while sliding, for which it uses a couple of sealing elements such as, for example, 0-rings, one for the inner diameter and another for the outer diameter.

The floating piston has a stepped base that, along with the guide bushing and the housing, configures an amplifier chamber which increases in volume as the floating piston is pushed to slide along the guide bushing when the pressure increases as a result of the inlet of fluid. The other side of the floating piston is in contact with the elastic element, which presses it against the base of the housing.

The floating piston can comprise a leakage channel that crosses through it, preferably parallel to the shaft of the rod which, on one side, is open towards the amplifier chamber and on the other, is closed by a pressure control valve which, in this case, is a pressure-limiting valve. In this case, the diameter of the guide bushing decreases in an intermediate area along the length thereof that configures a stop limiter, in the form of a step, wherein the end that is in contact with the housing is the one with the smallest diameter, for which the floating piston also incorporates a protrusion in the inner diameter, in the form of a step, although inverted with respect to the step that forms the stop limiter of the guide bushing, such that the two steps are complementary, that is, the side of the floating piston closest to the housing has a larger inner diameter than the side closest to the piston. In this manner, the sliding of the floating piston along the guide bushing is limited to a certain length marked by the stop limiter.

Alternatively, the floating piston is not crossed through by any channel but rather, it is the housing comprising a passageway that is closed with a pressure control valve which, in this case, is a pressure-regulating valve that is activated when subjected to a certain working pressure. In this case, the movement of the floating piston is limited by the pressure value in the amplifier chamber, which will stop increasing when the pressure-regulating valve is activated as soon as the working pressure is reached. Depending on whether it is an extension or compression movement, the pressure in the traction or compression chamber, respectively, is transmitted to the other side of the piston, deforming the primary valve for the flow of fluid. This pressure is also transmitted through the channel and the narrow duct, which also causes an increase in volume in the amplifier chamber, pushing the floating piston, which in turn pushes the elastic element, and the elastic element pushes the secondary valve, which is coupled with the primary valve, limiting the deformation thereof caused by the direct pressure of the fluid.

However, the thrust of the floating piston and, therefore, the elastic element, on the secondary valve which, in turn, acts on the primary valve, is limited because, due to the stop limiter or the pressure-regulating valve, depending on the configuration of the frequency amplifier, the movement of the floating piston is limited, as has been described above. Also, since the movement of the floating piston is limited, if a stop limiter is provided, an additional increase in pressure along the channel results in an increase in pressure in the amplifier chamber. However, this pressure cannot increase indefinitely, as the components of the amplifier may not withstand the mechanical stress. To avoid this indefinite increase in pressure, the pressure in the amplifier chamber is limited by a pressure-limiting valve when using the stop limiter to create a mechanical limitation for the movement of the floating piston, or by a pressure-regulating valve to generate a hydraulic regulation for the pressure in the amplifier chamber which, in either case, opens, enabling the outlet of the fluid, when a certain pressure is reached, into the chamber containing the frequency amplifier, which can be either the compression or the traction chamber.

This resolves one of the problems described in the background. In document WO2017112978, regarded as the closest state of the art, there is no element limiting the movement of the frequency chamber, which causes a degradation in the speed-dependent damping feature, which likewise degrades comfort. Since document WO2017112978 does not provide a limitation to the movement of the frequency chamber, it is very difficult to achieve low damping at medium and high speeds to maximise comfort, since the gain applied by the frequency system will continue to increase without limit with the increase in pressure associated with the increase in speed.

Also, thanks to the pressure control exerted by the pressure-control valves inside the frequency amplifier, this invention is able to protect the components of the shock absorber. This does not occur in the invention described in WO2017112978, which does not guarantee the integrity of its components.

Moreover, the invention shown in patent document U.S. Pat. No. 9,534,653_B2 may appear visually similar to the invention because it incorporates the frequency amplifier with the pressure-regulating valve. However, the functionality is completely different. In the case of U.S. Pat. No. 9,534,653_B2, its function is to limit the maximum pressure inside the chamber (401), while the function of the pressure-regulating valve, in addition to this, is to control the force exerted on the main valves, which does not occur in U.S. Pat. No. 9,534,653_B2, such that the function of this pressure-regulating valve is to control damping over the entire speed range.

Moreover, the degree of throttling with respect to the flow of fluid offered by the primary valve can be configured by means of a series of elements, including the elastic element, by means of the elasticity coefficient thereof, outer diameter and number of washers making it up, the secondary valve, in terms of elasticity and size and the fact that it can be composed of one or several discs, the spacer located between the primary and secondary valves, in terms of outer diameter and thickness, the location of the stop limiter along the length of the guide bushing, which will define the maximum position of the floating piston over the other components, as well as the working value of the pressure-regulating valve or, obviously, by means of several of the above elements at the same time.

The frequency amplifier can be located in the traction chamber, in the compression chamber, or in both. Furthermore, it can also be located on the valve holder in direct contact with the reserve chamber.

BRIEF DESCRIPTION OF THE DRAWINGS

To supplement the description that is being made and in order to aid a better understanding of the features of the invention according to a preferred example of a practical embodiment thereof, a set of drawings has been attached which represents the following figures by way of illustration and not limitation:

FIG. 1 represents a longitudinal cross-sectional view of the shock absorber of the invention in a two-tube version for extension movements.

FIG. 2 represents a longitudinal cross-sectional view of the shock absorber of the invention in a two-tube version for compression and extension movements according to a first embodiment.

FIG. 14 represents a graph with the damping force as a function of the oscillation speed of a shock absorber.

FIG. 15a represents a graph with the variation in the damping force as a function of the piston stroke without incorporating a frequency control device.

FIG. 15b represents a graph with the variation in the damping force as a function of the piston stroke incorporating a frequency control device.

FIG. 16 shows how the regulation of the shock absorber varies due to feedback when it is not limited.

The following is a list of the references used in the figures:
1. Rod.
2. Pin of the rod.
3. Retainer.
4. Guide.
5. Outer tube.
6. Inner tube.
7. Reserve chamber.
8. Traction chamber.
9. Compression chamber.
10. Piston.
11. Lower cover.
12. Gas.
13. Fluid.
14. Fluid level.
15. Anti-return valve.
16. Valve holder.
17. Compression valve.
18. Housing.
19. Floating piston.
20. Pressure-limiting valve.
21. Guide bushing.
22. Channel.
23. Primary valve.
24. Secondary valve.
25. Elastic element.
26. Narrow duct.
27. Leakage channel.
27a. First permanent opening.
28. Frequency amplifier.
29. Amplifier chamber.
30. Stop limiter.
31. Extension through hole.
32. Compression through hole.
33. Relief disc.
34. Spacer.
35. Sealing element.
36. Pressure-regulating valve.
37. Passageway.
37a. Second permanent opening.

DESCRIPTION OF THE INVENTION

As indicated above, the present invention relates to a shock absorber which is capable of regulating the load generated by a hydraulic device depending on the speed and frequency to which it is subjected simultaneously.

FIGS. 1 to 5 represent various embodiments of the shock absorber of the invention depending on whether they are intended to work only during the extension stroke or in the compression and extension stroke, both in two-tube and single-tube shock absorbers.

FIG. 1 represents a longitudinal cross section of a two-tube shock absorber according to the invention, capable of regulating the load only during the extension stroke.

Figure 3:
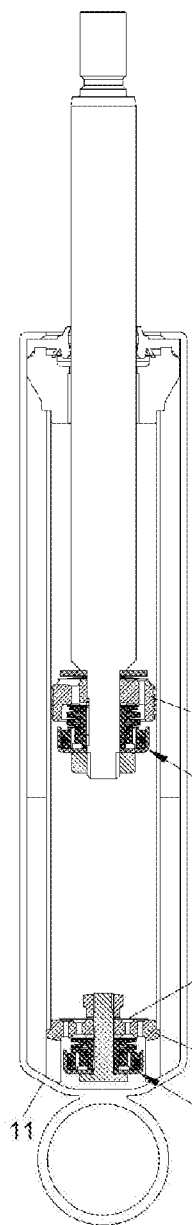
FIG. 3 represents a longitudinal cross-sectional view of the shock absorber of the invention in a two-tube version for compression and extension movements according to a second embodiment.

FIGS. 2 and 3 represent a longitudinal cross section of a two-tube shock absorber according to the invention, capable of regulating the load during the compression and extension movements in two different embodiments.

Figure 4:
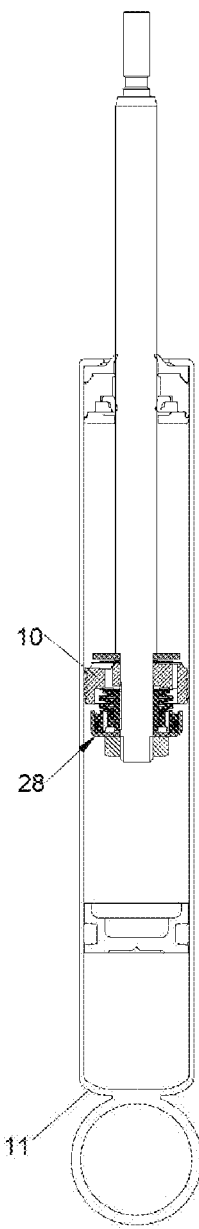
FIG. 4 represents a longitudinal cross-sectional view of the shock absorber of the invention in a single-tube version for extension movements only.

FIG. 4 represents a longitudinal cross section of a single-tube shock absorber according to the invention, capable of regulating the load only during the extension stroke.

Figure 5:
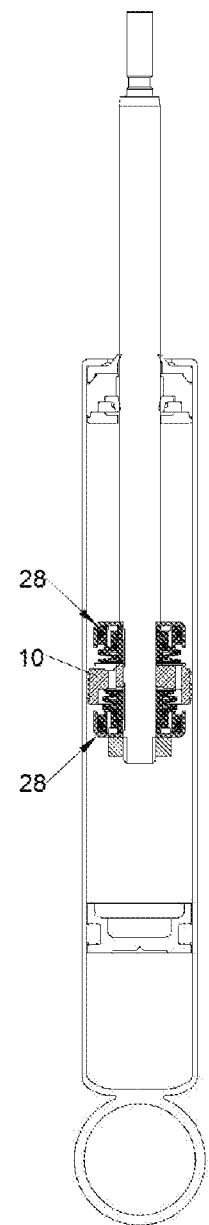
FIG. 5 represents a longitudinal cross-sectional view of the shock absorber of the invention in a single-tube version for compression and extension movements.

FIG. 5 represents a longitudinal cross section of a single-tube shock absorber according to the invention, capable of regulating the load during the compression and extension strokes.

Before explaining the operation of the shock absorber of the invention, a description thereof will be provided in order to understand each of the components thereof, how they are positioned and the relationship between them. The shock absorber to be described can be either a single-tube or a two-tube shock absorber for the extension movement. The operation thereof can be easily deduced from this description for cases wherein the shock absorber operates only for the compression movement, due to which it has not even been mentioned in the figures, nor for both.

FIGS. 1 to 5 will be briefly described once the components and the mode of operation of the shock absorber are understood.

The shock absorber of the invention can be a two-tube shock absorber, without the extension to a single-tube shock absorber being a problem, such as those formed by an outer tube (5) closed at one of the ends thereof and with an opening at the other end for the passage of the rod (1). To ensure that this opening is sealed, a retainer (3) is placed between the rod (1) and the end of the outer tube (5).

An inner tube (6), which is concentric to the outer tube (5), is provided, one end of which is solidly fixed to the closed end of the outer tube (5) and the other end of which incorporates a guide (4) for fixing to the outer tube (5) and for guiding the rod (1) in the longitudinal movement thereof. Between the outer tube (5) and the inner tube (6) there is a space constituting a reserve chamber (7), which will be filled with fluid (13) up to a certain level (14) above which the reserve chamber (7) is filled with gas (12).

The closed end of the outer tube (5) is joined to one end of the inner tube (6) that incorporates a valve holder (16) with holes communicating the compression chamber (9) with the reserve chamber (7). Some holes are closed by an anti-return valve (15) and other holes are closed by a compression valve (17), such that the corresponding valve (15, 17) opens depending on whether the movement is an extension or a compression movement, respectively.

One end of the rod (1) ends in a pin of the rod (2) wherein a piston (10) is assembled, which slides tightly along the inner tube (6) and incorporates extension through holes (31) and compression through holes (32) that communicate the traction chamber (8) with the compression chamber (9). A second compression valve (17) that rests on the compression through holes (32) is located on the piston (10) on the side of the traction chamber (8).

In addition to the piston (10), the shock absorber of the invention comprises a primary valve (23), a secondary valve (24) and a frequency amplifier (28) comprising a main portion of the components that make up the invention in the pin of the rod (2).

The frequency amplifier (28) comprises, as main elements, a guide bushing (21), which has a cylindrical configuration and embraces the pin of the rod (2), a housing (18), which also embraces the pin of the rod (2), and a floating piston (19). The housing (18) has a cylindrical configuration, formed by a base and a concentric wall with respect to the pin of the rod (2) and fixed thereto, creating a volume where other moving components are located. The pin of the rod (2) incorporates at least one inner channel (22) along a length from the piston (10) on one end to the housing (18) on the other end. In the space formed between the housing (18) and the guide bushing (21) the floating piston (19) is located, which is capable of sliding along the guide bushing (21) and the wall of the housing (18) in a sealed manner, for which it uses a couple of sealing elements (35) such as, for example, O-rings, one for the inner diameter and another for the outer diameter. The floating piston (19) has a base with a stepped section which, together with the housing (18) and the guide bushing (21), define an amplifier chamber (29) with a variable volume as the floating piston (19) slides along the guide bushing (21).

Figure 7:
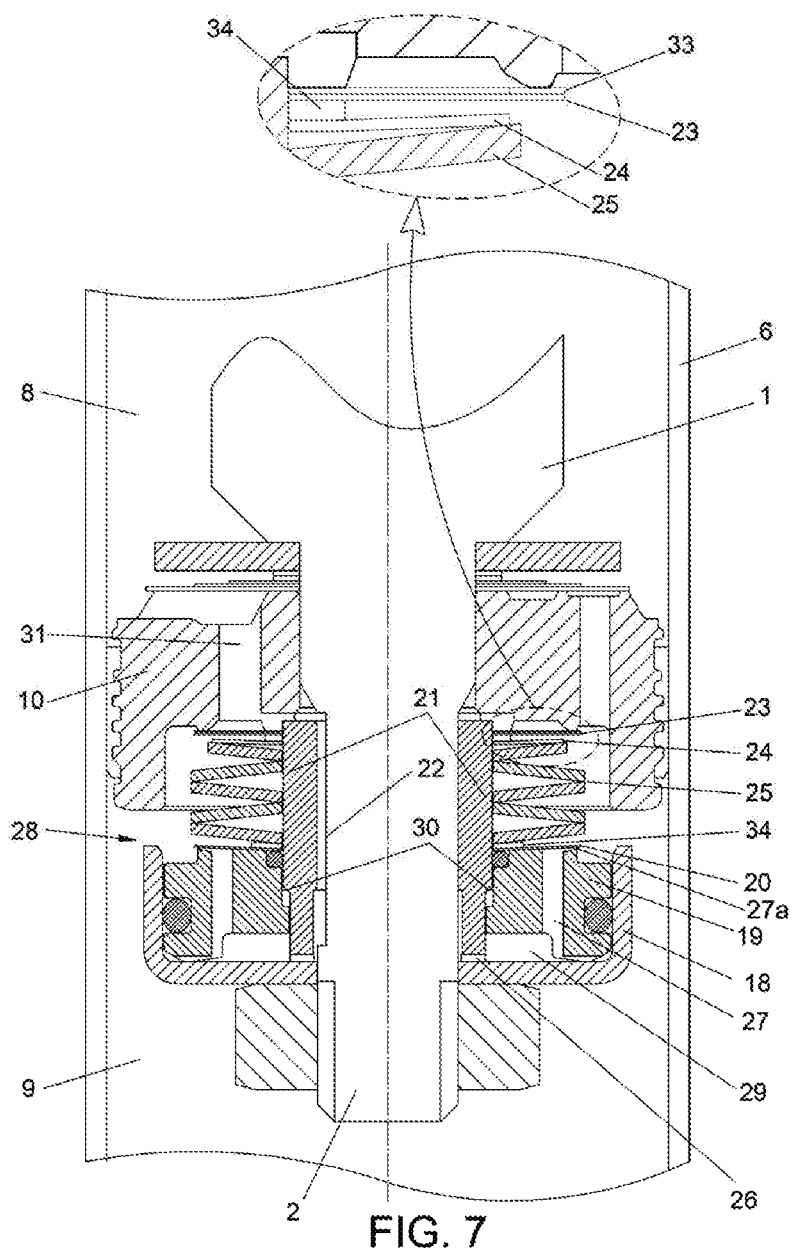
FIG. 7 represents a view of the shock absorber of FIG. 6 according to a second embodiment wherein the valves are located in a sliding configuration with respect to the guide bushing rather than being embedded.

In a first embodiment of the frequency amplifier (28), the floating piston (19) comprises a leakage channel (27) that can be partially closed by means of a pressure-limiting valve (20) that communicates the amplifier chamber (29) with the compression chamber (9), since there is always a first permanent opening (27a) as shown in FIG. 7.

Moreover, the outer diameter of the guide bushing (21) decreases in an intermediate area of the length thereof, configuring a stop limiter (30) in the form of a step, such that the floating piston (19) is capable of sliding between the base of the housing (18) and said stop limiter (30), which acts as a mechanical limitation of the deformation force which may act on the elastic element (25). When the floating piston (19) reaches the stop limiter (30), the pressure in the amplifier chamber (29) will increase up to the rating level of the pressure-limiting valve (20), causing it to open it in order to ensure that the pressure in the amplifier chamber (29) does not continue to increase.

In a second embodiment of the frequency amplifier (28), the housing (18) comprises a passageway (37) on which a pressure-regulating valve (36) acts. This pressure-regulating valve (36) opens when the pressure in the amplifier chamber (29) reaches a certain value, hydraulically regulating the maximum pressure in the amplifier chamber (29) and thus the force exerted by the elastic element (25) on the secondary valve (24). In any case, it exhibits a second permanent opening (37a). The advantage of this embodiment over the previous one is that the dimensional control associated with the assembly formed by the stop limiter (30) and the floating piston (19) is not required. There is a substantial difference between these two embodiments. In the first embodiment, the pressure-limiting valve (20) is rated at a high limit pressure level only to prevent the components from breaking, without intervening in the load control of the system, which will be defined by the deformation exerted on the elastic element (25). In the second embodiment without the stop limiter (30), the main function of the pressure-regulating valve (36) is to regulate the force to be exerted by the amplifier on the primary valve (23). It is rated at a much lower limit pressure and defines the hydraulic function of the shock absorber.

In both embodiments, the primary valve (23) rests on the extension through holes (31), preferably by means of a relief disc (33) that establishes a permanent flow cross section for the fluid, and in an additional embodiment, it is embedded between the piston (10) and one of the ends of the guide bushing (21). The other end of the guide bushing (21) rests on the housing (18) and has narrow ducts (26) at the end. The floating piston (19) supports an elastic element (25), which surrounds the guide bushing (21), and extends until it makes contact with the secondary valve (24) at the other end.

The guide bushing (21) embraces a portion of a longitudinal surface channel (22) comprising the pin of the rod (2) by means of which the traction chamber (8) is hydraulically communicated with the amplifier chamber (29). The narrow ducts (26) of the guide bushing (21) communicate the amplifier chamber (29) with the channel (22) of the pin of the rod (2) and, finally, with the traction chamber (8). In one embodiment, the narrow ducts (26) are formed by a castellated finish of the guide bushing (21). In an alternative embodiment, the end of the guide bushing (21) does not have narrow ducts (26), but rests on a second relief disc (33) that incorporates the communication ducts.

The primary valve (23) is located in contact with the piston (10), preferably by means of a relief disc (33). The secondary valve (24), on the other hand, is located between two spacers (34), one which separates it from the primary valve (23) and another which separates it from the elastic element (25), defining the stiffness of the secondary valve (24). The spacer (34) can be, for example, a washer. In this manner, the primary (23) and secondary (24) valves are separated by a spacer (34) which leaves a space between them which can be configured according to the thickness and outer diameter thereof.

As depicted in FIG. 7, in a second embodiment the primary (23) and secondary (24) valves, together with the relief disc (33) and the spacers (34), instead of being embedded, embrace the guide bushing (21), on which they can slide.

The operation of the shock absorber is as follows, with reference to FIGS. 6 to 10, which represent the piston (10), the primary valve (23), the secondary valve (24) and the frequency amplifier (28) coupled to the pin of the rod (2) sliding sequentially along the inner tube (6) of the shock absorber.

It should be noted that, for purposes of clarity and to avoid introducing too many elements in the figures, the flow lines have been represented only on one of the sides of the sections represented in these figures, when in reality they should also be on the other side.

Figure 6:
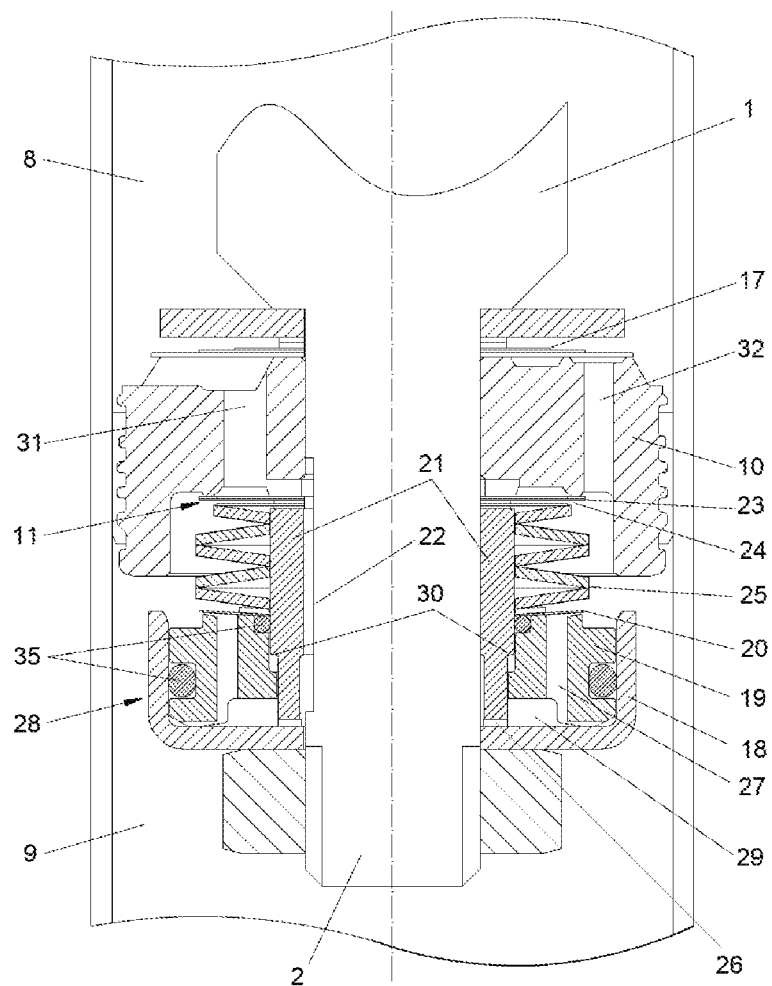
FIG. 6 represents a longitudinal cross-sectional view of the detail of the area of the piston of the shock absorber of FIG. 1 in a rest position.

FIGS. 6 and 7 represent the shock absorber in a rest position according to the two embodiments wherein the valves (23, 24) are embedded between the piston (10) and one of the ends of the guide bushing (21) and embrace the guide bushing (21), respectively.

Figure 8:
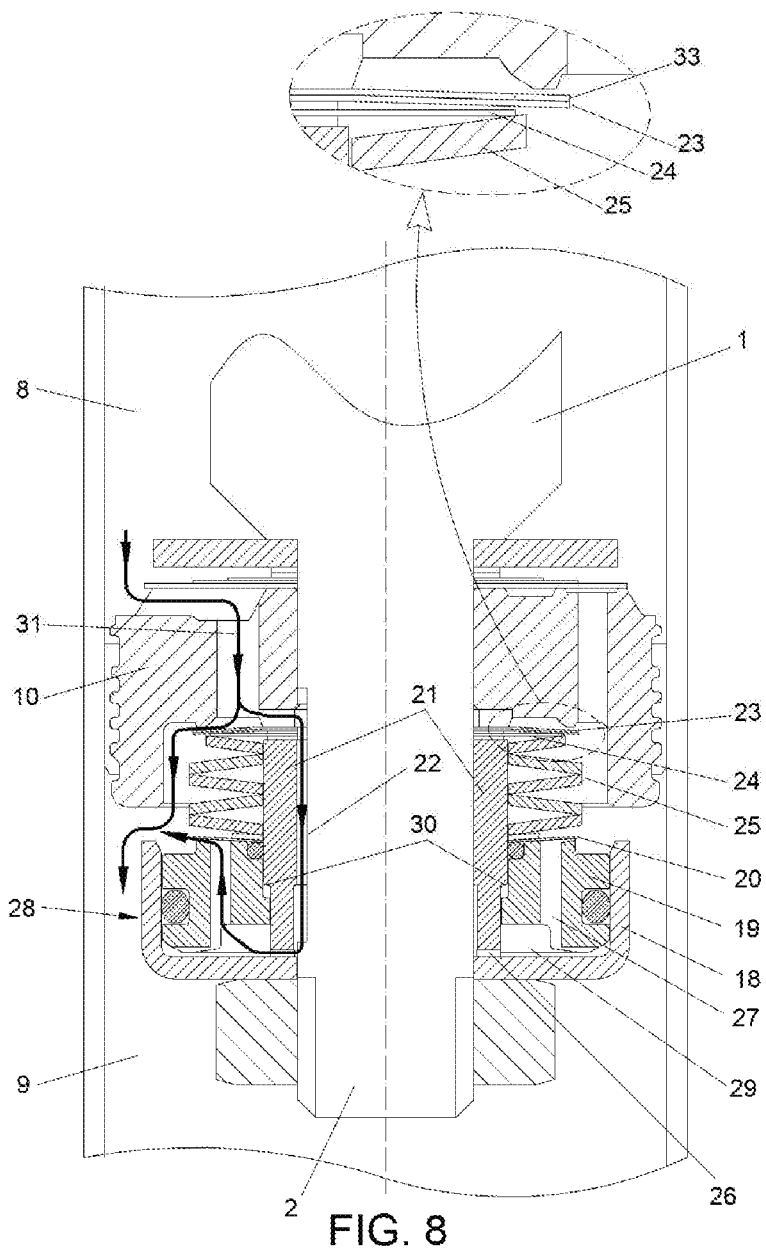
FIG. 8 represents a view of the shock absorber of FIG. 6 when the low-frequency extension movement starts and with the primary and secondary valves still decoupled.

Once pressure is exerted on the traction chamber (8), as shown in FIG. 8, the primary valve (23) begins to bend such that, by being separated from the secondary valve (24) by a spacer (34), it tends to make contact with the same. This bending caused by the extension movements of the shock absorber causes fluid to flow through two paths operating in parallel. The primary passageway goes from the traction chamber (8) to the compression chamber (9) through the primary valve (23). The secondary passageway leads the fluid situated on the primary valve (23) through the longitudinal channel (22) and the narrow duct (26) towards the amplifier chamber (29). Once here, the amplifier enables the outlet of a portion of the incoming fluid towards the compression chamber (9) through the leakage channel (27) using the pressure-limiting valve (20), which is not airtight, by incorporating the first permanent opening (27a), and enables the outlet of fluid towards the compression chamber (9) or through the pressure-regulating valve (36), which is also not airtight, by incorporating the second permanent opening (37a), depending on the embodiment of the frequency amplifier (28). This configuration leads to an increase in pressure in the traction chamber (8) with respect to the compression chamber (9), which is partially transmitted to the amplifier chamber (29). The excess pressure in the amplifier chamber (29) with respect to the compression chamber (9) is exerted on the floating piston (19), making it slide and thus pushing the elastic element (25), which in turn pushes the secondary valve (24). The existence of a spacer (34) between the primary valve (23) and the secondary valve (24) means that the sliding of the floating piston (19) is not immediately transmitted to the primary valve (23).

The extension movements of the shock absorber carried out at a low frequency, provide enough time to enable the secondary valve (24) to come into contact with the primary valve (23).

Figure 9:
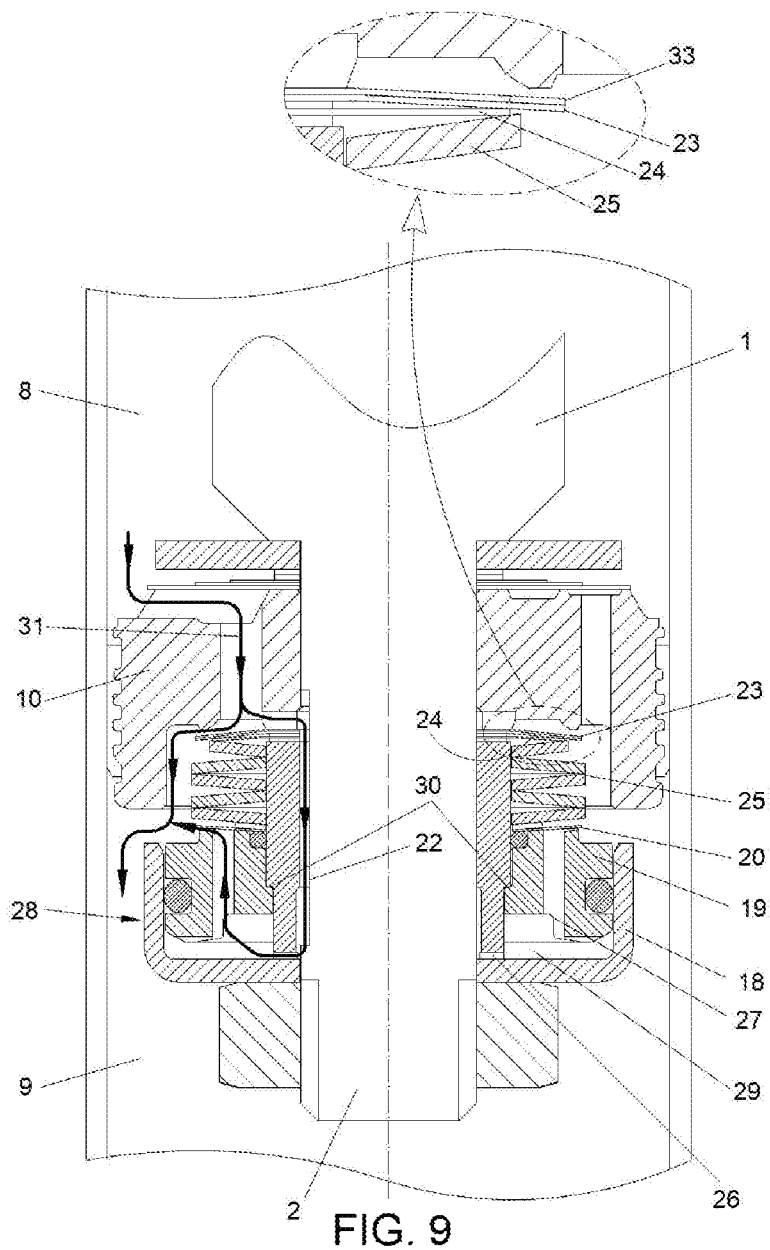
FIG. 9 represents a view of the shock absorber of FIG. 8 when the valves have already been coupled.

A subsequent situation is depicted in FIG. 9, which shows how the movement of the floating piston (19), which pushes the elastic element (25) and the secondary valve (24), is now enough to achieve contact between the partially open primary valve (23) and the secondary valve (24). With this configuration, the force exerted by the excess pressure in the amplifier chamber (29) is transmitted to the primary valve (23), inducing greater throttling in the flow of fluid between the traction chamber (8) and the compression chamber (9). The largest difference in pressure is transmitted to the amplifier chamber (29), increasing the incoming flow into the amplifier, which again increases the throttling exerted by the primary valve (23) to the flow of fluid. This feedback phenomenon increases the difference in pressure between the traction chamber (8) and the compression chamber (9) and, therefore, the force counteracting the extension movement produced by the shock absorber. It can be understood that the existence of the secondary valve (24) is of paramount importance given that, if absent, the feedback cycle is triggered from the very beginning of the extension movement of the shock absorber, making it extremely difficult to control the frequency of the force it provides. That is, it is very difficult to obtain different responses from the shock absorber for a movement of 1 Hz versus a movement of 10 Hz, since the process would be extremely fast.

If the frequency of movement is low enough and/or the extension speed is sufficiently high to transfer the required fluid volume to the amplifier chamber (29), the floating piston (19) slides, considering the first embodiment of the frequency amplifier (28) until it comes into contact with the stop limiter (30), as shown in FIG. 9, or until the amplifier chamber (29) reaches the regulating pressure established by the pressure-regulating valve (36). At this moment, the feedback phenomenon is limited, preventing the transmission of additional force from the frequency amplifier (28) to the primary valve (23). This limit to the force that is transmitted is essential both to ensure the structural integrity and to respect the main function of the shock absorbers shown in FIG. 14, expressed as a damping force curve as a function of the oscillation speed. As commented above, the only function of the pressure-limiting valve (20) is to protect the components of the system, with the maximum deformation on the elastic element (25) permitted by the stop limiter (30) being responsible for determining the force-speed curve, which is limited. However, the pressure-regulating valve (36) performs both functions, both protecting the structural integrity of the components of the system and reproducing the force-speed curve without limitation.

Feedback is configured to not reach the limit thereof at low speeds, such that the high damping values required for this mode of operation can be boosted by the frequency amplifier (28). In the case of the pressure-limiting valve (20), the limitation is applied to medium and, in particular, high operating speeds of the shock absorber, although it is not strictly necessary in the case of the pressure-regulating valve (36), which should open at low speeds. The opening of the pressure-regulating valve (36) can be configured for low-speed movements given that, in addition to limiting the maximum feedback force, it also manages the response of the shock absorber throughout the operating range thereof. This management by the pressure-regulating valve (36) is achieved by providing it with a configuration similar to that of the primary valve (23), which is perfectly adapted to generate the optimum level of damping for each speed. Thus, since the frequency amplifier (28) can be configured to provide most of the fluid throttling in the primary valve (23), the limitation thereof makes it possible to combine the significant degree of damping required at low speed to provide stability to the vehicle, with a low damping coefficient at high speed capable of minimising the transfer of any unevenness in the terrain to the cabin which, on the other hand, maximises comfort. Therefore, the invention acts both regarding frequency as well as speed.

Figure 10:
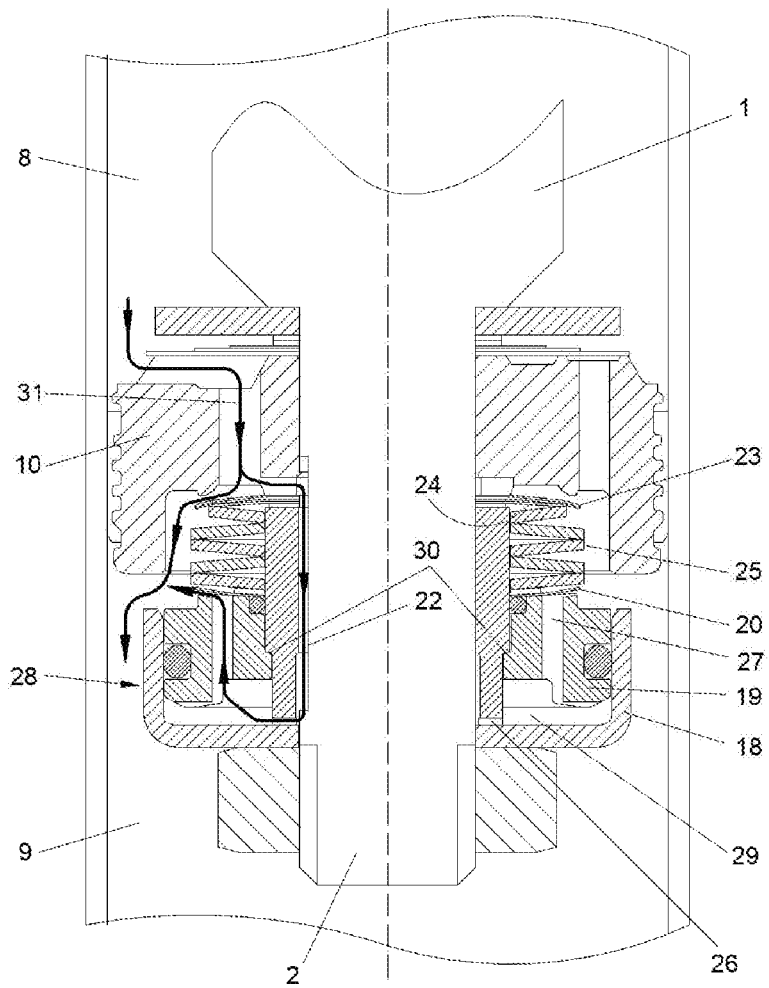
FIG. 10 represents a view of the shock absorber of FIG. 9, showing the limitation in feedback with the stop limiter and the release of pressure by opening the pressure-limiting valve.

Considering the first embodiment of the frequency amplifier (28), the volume of the amplifier chamber (29) is set without any possibility of increasing once the floating piston (19) reaches the stop limiter (30). If the extension cycle of the shock absorber continues under the right conditions, the pressure in the amplifier chamber (29) increases, approaching the pressure in the traction chamber (8). The existence of permanent openings (27a, 37a) prevents both pressures from becoming equal by ensuring a minimum leakage rate through the frequency amplifier (28). This limitation on the pressure may be insufficient for high-speed movements, due to which a pressure-limiting valve (20) is required. As shown in FIG. 10, this pressure-limiting valve (20), being subjected to the pressure differential between the amplifier chamber (29) and the compression chamber (9) by means of the leakage channels (27), ends up opening for a preset value of the aforementioned difference in pressure, enabling a greater outlet of fluid from the amplifier chamber (29) towards the compression chamber (9). In this manner, the components of the frequency amplifier (28) are protected against excess pressures in the amplifier chamber (29), ensuring the strength and durability thereof against a wide range of speeds in the movements of the shock absorber. This also occurs when considering the second embodiment of the frequency amplifier (28) with the pressure-regulating valve (36), which has the same effect by means of the damping regulation function thereof.

Figure 11:
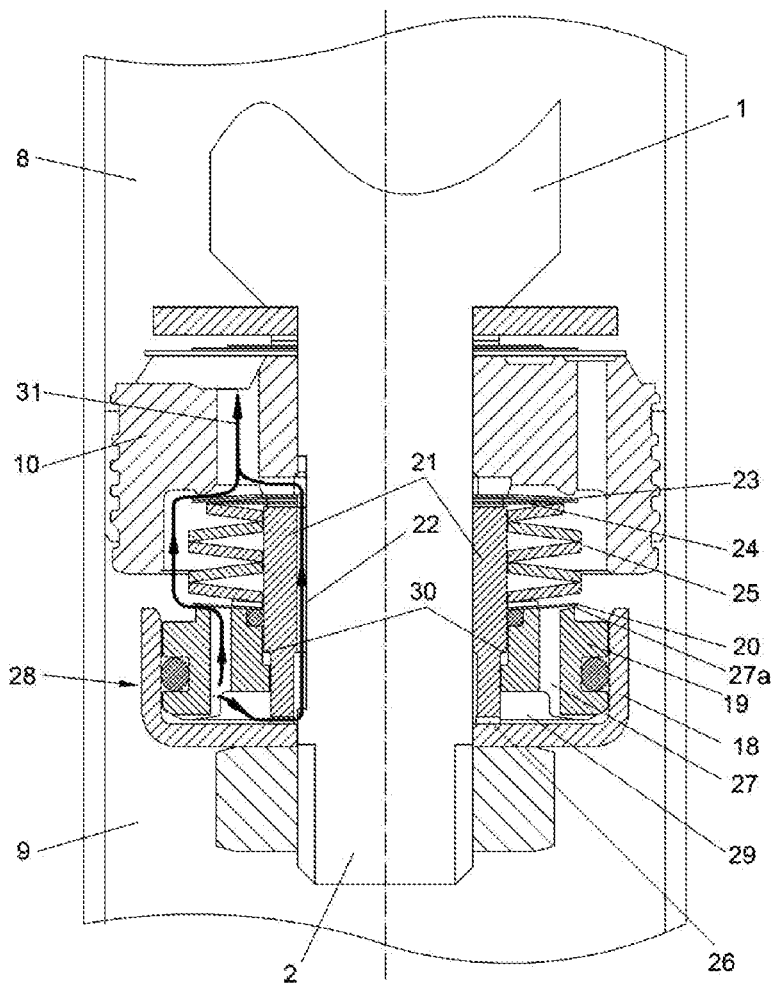
FIG. 11 represents a view of the shock absorber of FIG. 8 an instant after the extension movement is complete, when the system begins to return to the rest position thereof.
Figure 13:
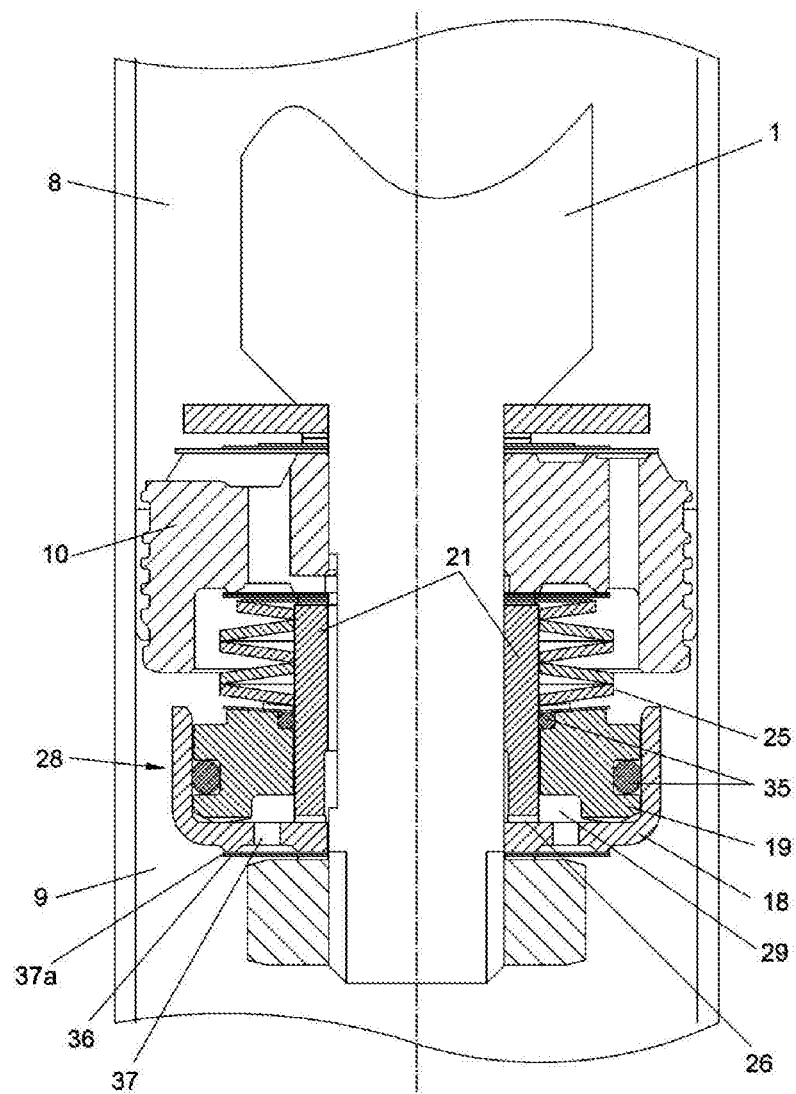
FIG. 13 represents a view of the shock absorber of FIG. 9, showing the limitation in feedback in a second embodiment with a pressure-regulating valve.

Nearing the end of the extension movement of the shock absorber, the speed thereof decreases, reducing the flow rate passing through the primary valve (23). This leads to a reduction in the difference in pressure between the traction chamber (8) and the compression chamber (9) which, in turn, is associated with less pressure in the amplifier chamber (29). To do this, the flow direction of the fluid is reversed in the narrow duct (26), with the fluid exiting the amplifier chamber (29) towards the traction chamber (8). This is illustrated in FIG. 11, with the fluid exiting the amplifier chamber (29) both through the narrow duct (26) and the leakage channel (27), through the first permanent opening (27a) or, as shown in FIG. 13, through the second permanent opening (37a).

The leakage channel (27) and the pressure-regulating valve (36) are the main fluid outlet pathways in the final phase of the extension movement in the two embodiments of the frequency amplifier (28) due to the larger difference in pressure between the amplifier chamber (29) and the compression chamber (9), than the difference in pressure between the amplifier chamber (29) and the traction chamber (8). This is due to the fact that, during any extension movement, the pressure in the traction chamber (8) is always higher than that in the compression chamber (9). This ratio is reversed when the shock absorber begins the compression phase, with the largest pressure differential being between the amplifier chamber (29) and the traction chamber (8), and making the narrow channel (26) the preferred pathway for emptying the amplifier chamber (29).

During the filling of the amplifier chamber (29), the fluid enters through the narrow duct (26) and exits through the permanent openings (27a, 37a), such that the effective filling cross section, which is the fundamental element for regulating the sliding speed of the floating piston (19), is the difference between both of them. In this manner, each of the cross sections can be larger, since the difference between the two, which must be a small cross section, controls the frequency behaviour of the frequency amplifier (28). This involves a simpler and more robust manufacture of the control channels associated with their larger size when compared to existing solutions in the state of the art. Further, the simultaneous operation thereof to enable the fluid to exit the amplifier chamber (29) during the final phase of the extension movement and throughout the compression stroke, makes it a large flow cross section, the sum of both, which ensures the quick return of the floating piston (19) to the rest position thereof. Returning to the rest position should take place as soon as possible to ensure that system is always prepared for regulation at high frequency, where the cycle is very fast. This construction is advantageous due to the simplicity of the execution thereof and because it enables the invention to operate at much higher operation frequencies than those that it should regulate.

When the extension movement occurs at a high frequency, the distribution of flow rates is not altered compared to the distribution that takes place at low-frequency movements shown in FIG. 8: a primary flow is established between the traction chamber (8) and the compression chamber (9) through the primary valve (23). A second flow passes through the amplifier chamber (29), with the fluid exiting the upper portion of the primary valve (23) to reach the amplifier chamber (29) by means of the channel (22) of the pin (2) and the narrow duct (26). Some of the incoming fluid exits the chamber (29) towards the compression chamber (9) through the leakage channel (27) through the first permanent opening (27a) or through the second permanent opening (37a). FIG. 10 shows this flow arrangement for a high-frequency cycle with the pressure-limiting valve (20). The difference between the two movements is the duration thereof, which is much lower in the case of a high-frequency cycle. For the frequency amplifier (28) to start the feedback cycle, the floating piston (19) must move, in the direction expanding the volume of the amplifier chamber (29). In fact, feedback is not triggered until the movement of the floating piston (19) is enough to enable the secondary valve (24) to come into contact with the primary valve (23), both separated by the spacer (34). The pressure required to achieve that movement of the floating piston (19) is a function of the thickness and diameter of the spacer (34), the stiffness of the secondary valve (24), and the stiffness of the elastic element (25). Moreover, the volume of fluid that must enter the amplifier chamber (29) to enable that minimum movement of the floating piston (19) is a function of the cross section of the aforementioned chamber. Finally, the time required to complete this filling depends on the difference in pressure between the traction chamber (8), the compression chamber (9) and the amplifier chamber (29), as well as the restrictions imposed on the inlet of fluid through the narrow duct (26) and on the outlet of fluid through the permanent openings (27a, 37a).

The permanent openings (27a, 37a) enable the filling of the amplifier chamber (29) to be much slower than the emptying thereof.

To regulate the frequency of the damping, the amplifier chamber (29) must be filled slowly and emptied relatively quickly in order to enable the system to be prepared for a new cycle.

In the event of an extension movement, the difference in pressure between the traction chamber and the compression chamber is high, due to which current systems employ a small access cross section to the frequency chamber that makes it possible to fill the traction chamber slowly. However, using a small filling cross section makes it difficult to empty the frequency chamber. The frequency chamber is emptied due to the higher pressure in the frequency chamber with respect to the traction chamber. However, this difference in pressure is lower than the difference in pressure that fills the frequency chamber during the extension phase, which is why the emptying of the chamber is much slower than the filling thereof. If the system is not fully emptied before the start of the next high-frequency cycle, the regulator loses efficiency.

In the system of the present invention, the incorporation of a permanent opening (27a, 37a) for a controlled outlet of fluid into the amplifier chamber (29) makes it possible to use larger cross sections, since said controlled outlet of fluid makes it difficult to fill the chamber (29). This results in a slow filling of the chamber (29) and a quick emptying thereof, which enables the system to be prepared for a new cycle without affecting the efficiency thereof.

Given that high-frequency movements are very short, the volume of fluid transferred to the amplifier chamber (29) may be insufficient for the sliding of the floating piston (19) to cause the secondary valve (24) to come into contact with the primary valve (23). In such a case, there is no feedback and the loads of the shock absorber are determined by the configuration of the extension through hole (31) and the primary valve (23). If the range of motion or the speed are greater, there will be a greater volume of fluid transferred to the amplifier chamber (29), with which the feedback process can begin as shown in the detail of FIG. 9. The parameters of the invention that can be configured, as cited in the previous paragraph, are selected to ensure there is not enough time for the feedback process to reach the limit thereof with movements at a frequency higher than the pre-established frequency. Thus, the force produced by the shock absorber against high-frequency movements is less than the force associated with low-frequency movements in either scenario.

The primary valve (23) can be configured with low pre-deformation and low stiffness in order to minimise the force counteracting the movement produced by the shock absorber at a high frequency. In this manner, comfort is maximised by minimising the transmission of unevenness on the road typically associated with high oscillation frequencies.

Another factor that conditions the speed of increase of the pressure is the volume of the chamber (29) itself or the combination of the stiffness of the secondary valve (24) and of the elastic element (25). The stiffness of the elastic element (25) and of the secondary valve (24) makes it possible to configure the degree of coupling between the primary valve (23) and the secondary valve (24). Also, along with the distance established by the spacer (34) between the primary valve (23) and the secondary valve (24), the system is provided with enormous versatility in the configuration thereof.

For low-frequency movement, e.g. 1 Hz, the system can be configured such that the movement of the floating piston (19) reaches the stop limiter (30). This aspect sets a limit to the stroke of the floating piston (19), such that the maximum force transferred by the amplifier (28) to the primary valve (23) by means of the elastic element (25) and the secondary valve (24) is limited. In other words, however long the duration of the movement or the magnitude of the pressure exerted on the primary valve (23), the maximum gain in terms of force provided by the frequency amplifier (28) is limited, as the feedback cycle is interrupted by the stop limiter (30). This makes it possible to apply large gains at low speed, since they are limited at high speed.

Subsequently, as shown in FIG. 10, the traction chamber (8) has exceeded a certain pressure level. The floating piston (19) has already come into contact with the stop limiter (30) and can no longer move, due to which the amplifier chamber (29) can no longer continue to increase in volume and increases the pressure, making the fluid located in the leakage channel (27) cause the opening of the pressure-limiting valve (20) to counteract the increase in pressure by the outlet of fluid from the amplifier chamber (29). This takes place in the first embodiment of the frequency amplifier (28).

In the second embodiment, shown in FIG. 13, the pressure-regulating valve (36) opens when the amplifier chamber (29) reaches the desired regulating pressure, and the pressure is counteracted by the outlet of fluid from the amplifier chamber (29). For this reason, the force received by both the elastic element (25) and the secondary valve (24) from the floating piston (19) is limited due to the limited movement of the floating piston (19, either mechanically, by the stop limiter (30), or hydraulically, due to the limitation in the pressure exerted from the amplifier chamber (29) by means of the pressure-regulating valve (36) and, therefore, the force they exert on the primary valve (23) is limited as well. As shown in FIG. 10, this means that the primary valve (23) will bend even further, due to the increase in pressure in the traction chamber (8) and the limited force it receives from the secondary valve (24) as described above. This avoids exceeding the strength of the parts involved in high-pressure situations.

Once the moment of maximum pressure in the traction chamber (8) has been exceeded, the floating piston (19) starts to move to the rest position. Returning to the rest position should take place as soon as possible, such that the system is always prepared for regulation at high frequency, where the cycle is very fast. In this scenario, FIG. 11 represents the distribution of fluid flow during the emptying period of the amplifier chamber (29) in which the invention has both the first permanent opening (27a) and the narrow duct (26) for the outlet of fluid from the amplifier chamber (29). As shown in FIG. 8, during the filling of the amplifier chamber (29), the first permanent opening (27a) enables the fluid to exit towards the compression chamber (9), such that this flow rate is subtracted from the flow rate entering the amplifier chamber (29) through the narrow duct (26) of the guide bushing (21).

However, during the emptying of the amplifier chamber (29), fluid outlet flows are established both by the permanent openings (27a, 37a), and by the narrow duct (26) of the guide bushing (21) due, respectively, to the pressures resulting from the generation of an increase in volume in the traction chamber (8) as a result of the movement of the piston (10), which causes fluid to flow from the amplifier chamber (29) towards the traction chamber (8) which, in addition to taking place through the channel (22) of the pin of the rod (2), it also takes place through the compression channel (32) located on the piston (10), as the compression valve (17) will be open for the same reason. Unlike in the filling phase, in the emptying phase the fluid flow rates through both sections (26, 27) are added together to empty the amplifier chamber (29) quickly and to enable the system to return to the rest position as soon as possible.

This construction is advantageous due to the simplicity of the execution thereof and because it enables the invention to operate at much higher operation frequencies than those that it should regulate. Thus, the fact that the shock absorber has two outlets for the fluid at the end of the extension cycle means that the frequency amplifier (28) returns to the rest position thereof very quickly. The speed of recovery of the amplifier chamber (29) depends on the size of the narrow duct (26) and the assembly formed by the leakage channel (27) together with the stress level design of the pressure-limiting valve (20) or the pressure-regulating valve (36).

The description of FIGS. 10 and 13 clearly shows the importance of limiting the movement of the floating piston (19) by means of the stop limiter (30) or the pressure-regulating valve (36), respectively. Otherwise, if the pressure in the traction chamber (8) and, therefore, in the amplifier chamber (29), increases excessively, the movement of the floating piston (19) would not be limited and it would not stop pressing against the elastic element (25), the elastic element (25) against the secondary valve (24), and the secondary valve (24) against the primary valve (23), causing not only the closure of the extension through hole (31), but also damage to the aforementioned components due to the excessive mechanical stress to which they would be subjected. Moreover, the fact that the frequency amplifier (28) incorporates either the stop limiter (30) or the pressure-regulating valve (36) means that the amplifier chamber (29) cannot increase the volume thereof, due to which the pressure in this chamber (29) is limited by the incorporation of pressure control valves (20, 36), configured to open when a certain level of pressure is reached.

Figure 12:
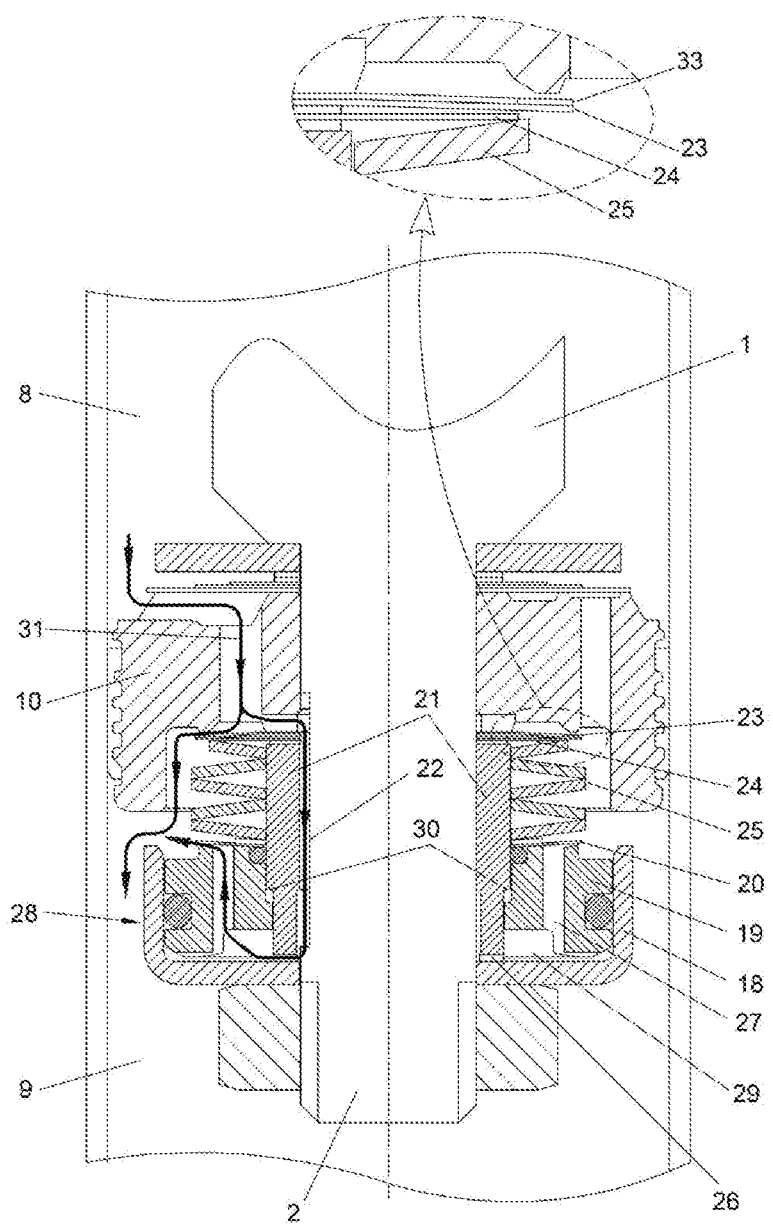
FIG. 12 represents a view of the shock absorber of FIG. 8 during a high-frequency extension movement.

The scenarios described in the figures are considered valid for shock absorbers working at low frequencies. However, in a high-frequency scenario, cycle times are very short and the shock absorber does not have time to send the fluid through a route which is quite long and requires too much time to complete, with which the fluid does not have the time to fill the amplifier chamber (29) and therefore does not have time to move the floating piston (19). This is why the frequency amplifier does not work at high frequency. The mode of operation in an extension cycle at high frequency is considered in FIG. 12. In this situation, the primary valve (23) is responsible for providing the damping load. Some of the fluid will tend to flow towards the amplifier chamber (29) through the channel (22), although the floating piston (19) will practically not move due to a lack of reaction time, and the entire damping effect will be carried out by means of the primary valve (23).

The separation between the primary valve (23) and the secondary valve (24) by means of the spacer (34), as well as the stiffness of such valves (23, 24), makes it possible to adjust the load of the shock absorber according to frequency.

With respect to FIGS. 1 to 5, with the understanding that the shock absorber of the invention is based on the incorporation of a frequency amplifier (28) with a maximum amplitude and the primary (23) and secondary (24) valves, we have the following:

FIG. 1 incorporates a frequency amplifier (28) joined to the piston (10) in the compression chamber (9), due to which it is intended to work under extension.

FIG. 2 incorporates two frequency amplifiers (28), each located on one side of the piston (10), due to which they are intended to work under extension and compression.

FIG. 3 incorporates two frequency amplifiers (28), one joined to the piston (10) in the compression chamber (9), due to which it is intended to work under extension, and the other located on the valve holder (16), intended to work under compression.

FIG. 4 incorporates a frequency amplifier (28) joined to the piston (10) in the compression chamber (9) of a single-tube shock absorber due to which, just like in FIG. 1, it is intended to work under extension.

FIG. 5 incorporates two frequency amplifiers (28), each located on one side of the piston (10) of a single-tube shock absorber, due to which, just like in FIG. 1, they are intended to work under extension and compression.

No shock absorbers have been represented with a single frequency amplifier (28) attached to the piston (10) in the traction chamber (8) for compression movements, because the reasoning is identical to that described when it is located in the compression chamber (9).

In the case shown in FIG. 3, wherein the frequency amplifier (28) for the compression movement is located on the valve holder (16) with direct access to the reserve chamber (7), the operation is identical to the case in which the frequency amplifier (28) is positioned joined to the piston (10) in the traction chamber (8).

In this manner, the invention comprises two valves, a primary valve (23) and a secondary valve (24), supported by an elastic element (25), with a partial coupling level that can be configured, and a hydraulic-mechanical amplification step that is carried out by the rest of components of the frequency amplifier (28).

The primary valve (23) is identical to those used in the state of the art for a conventional shock absorber. Optionally, it can incorporate a controlled permanent leak and the stiffness thereof and deformation can be configured previously to obtain the desired damping feature. In the figures, the primary valve (23) is depicted joined to a relief disc (33) that comes into contact with the piston (10) and which establishes a controlled leak level. The primary valve (23) is responsible for defining the high-frequency damping feature.

The secondary valve (24), in combination with the elastic element (25), is responsible for defining the low-frequency damping feature. The elastic element (25), in a preferred embodiment, is a stack of disc washers that configure a spring, also known as a Belleville or disc spring, which provides the configuration with great versatility. First, it provides a load, stroke and compactness ratio that is not possible with either helical compression springs or wave springs. Second, the stiffness thereof is reduced as it compresses, making it possible to combine high levels of low-speed damping with low levels of high-speed damping, giving the invention the capacity to simultaneously regulate the frequency and speed behaviours in the most advantageous way for the vehicle. This is key to improving riding comfort, enhancing the effect of frequency regulation.

The coupling of the primary (23) and secondary (24) valves can also be configured with the size and features of the two valves (23, 24) by choosing, for example, the outer diameter of the secondary valve (24) such that the primary valve (23) can bend over it once the maximum stroke of the floating piston (19) is reached. This helps minimise the increase in high-speed damping.

The coupling can also be configured using the thickness or diameter of the spacer (34), which will cause the stress that the secondary valve (24) must reach in order to come into contact with the primary valve (23) to be variable.

The coupling can also be configured by playing with the flexibility of the secondary valve (24) and the elastic element (25), since both elements are flexible. Thus, if a very stiff secondary valve (24) and a very flexible elastic element (25) are selected, the floating piston (19) will have to move more until the force of the amplifier (28) is transferred to the primary valve (23). The opposite configuration makes it possible to transmit force during shorter movements of the floating piston (19). These configurations provide the system with great versatility.

The coupling can also be configured by locating the stop limiter (30) along the length of the guide bushing (21), such that a location closer to the housing (18) involves a shorter maximum movement of the floating piston (19) and, therefore a lower maximum deformation of the elastic element (25), and therefore a lower maximum pressure exerted by the secondary valve (24) on the primary valve (23). This reduces the maximum load of the shock absorber, which is the load obtained for low-frequency movements.

The narrow duct (26) and the first permanent opening (27a), which set the level of restriction to the inlet and outlet of fluid from the amplifier chamber (29), respectively, can also be configured such that, in the case of a small difference in the flow cross section, the ascent of the floating piston (19) is slow, while in the case of a large difference in the flow cross section, the floating piston (19) will move faster. This configuration makes it possible to adjust the response of the system based on the frequency of the movement applied to the shock absorber.

Finally, it should be noted that the present invention should not be limited to the embodiment described herein. Other arrangements may be carried out by those with skill in the art based on the present description. Accordingly, the scope of the invention is defined by the following claims.

The invention claimed is:

1. A shock absorber with hydraulic load regulation simultaneously depending on speed and frequency comprising a rod with an end ending in a pin of the rod, to which a piston, separating a traction chamber from a compression chamber inside the shock absorber, is joined and comprising a through hole which enables communication between the traction chamber and the compression chamber, wherein the pin of the rod comprises a longitudinal channel and wherein the shock absorber comprises: a channel
   a primary valve,
   a secondary valve,
   a guide bushing fixed to the pin of the rod, embracing a portion of the channel and enabling fluid to pass through the channel between the two ends of the guide bushing,
   an elastic element embracing the guide bushing, and
   a frequency amplifier, comprising:
      a housing, fixed to the pin of the rod, configured by a base and a concentric wall with respect to the pin of the rod,
      a floating piston capable of sliding between the guide bushing and the wall of the housing, achieving a seal during the sliding, comprising a stepped base that, along with the guide bushing and the housing, configures an amplifier chamber, and
      a pressure control valve
   wherein:
   the primary valve is located in contact with the piston,
   the secondary valve is located in contact with the primary valve by means of a spacer, and with the elastic element,
   the elastic element is in contact with the floating piston,
   the guide bushing is joined to the housing at one end, enabling hydraulic communication between the channel and the amplifier chamber, and
   the pressure control valve incorporates a permanent opening that enables an outlet of fluid from the amplifier chamber and is configured to open when the amplifier chamber reaches a certain pressure level, enabling an outlet of fluid from the amplifier chamber with a higher flow rate,
   such that the pressure of the amplifier chamber acts on the floating piston, which moves to press the elastic element, which in turn acts on the secondary valve and regulates the opening of the primary valve up to a certain pressure level, controlled by the pressure control valve, in a form selected between a pressure-limiting valve and a pressure-regulating valve.

2. The shock absorber according to claim 1, wherein the primary valve and the secondary valve are to be selected between being embedded between the piston and the guide bushing and embracing the guide bushing.

3. The shock absorber according to claim 2, wherein deformation of the primary valve is defined by the configuration of an element to be selected between:
   the elastic element,
   the secondary valve,
   the spacer located between the primary and the secondary valves,
   the location of a stop limiter along a length of the guide bushing,
   an activation value of the pressure-regulating valve, and
   a combination of the above.

4. The shock absorber according to claim 3, wherein attachment of the guide bushing to the housing is carried out by means of a configuration to be selected between the incorporation of a relief disc and a castellated finish of the end of the guide bushing, wherein at least one narrow duct is provided.

5. The shock absorber according to claim 3, wherein the elastic element is an assembly of disc springs that can be configured in terms of elasticity, outer diameter and number.

6. The shock absorber according to claim 3, wherein the spacer can be configured in terms of outer diameter and thickness.

7. The shock absorber according to claim 1, wherein the housing comprises a passageway partially closed by the pressure-regulating valve since there is a second permanent opening, and which opens when a certain pressure is reached in the amplifier chamber.

8. The shock absorber according to claim 7, wherein the secondary valve can be configured in terms of elasticity and size.

9. The shock absorber according to claim 7, wherein an outer diameter of the secondary valve is configured according to a pressure that is desired to be exerted on the primary valve.

10. The shock absorber according to claim 1, wherein:
   a diameter of the guide bushing decreases in an intermediate zone of a length thereof to configure a stop limiter, in the form of a step, the end that comes into contact with the housing having the smaller diameter, and the floating piston comprises a leakage channel that crosses through it, closed by the pressure-limiting valve that leaves a first permanent opening, and a protrusion, in the form of a step, which is complementary to the stop limiter of the guide bushing, such that:

movement of the floating piston and the pressure on the elastic element are mechanically limited, and the pressure in the amplifier chamber is limited to a working pressure of the pressure-limiting valve.

11. The shock absorber according to claim 1, wherein the frequency amplifier is located in a position to be selected between the traction chamber, the compression chamber, and in both.

12. The shock absorber according to claim 1, wherein the frequency amplifier is located in a valve holder in direct contact with a reserve chamber.

* * * * *